United States Patent
Stancioff et al.

[15] 3,663,284
[45] May 16, 1972

[54] TITANIUM DIOXIDE SUSPENSIONS

[72] Inventors: Dimitri J. Stancioff, Camden, Maine; Henry J. Witt, Mine Hill, N.J.

[73] Assignee: Marine Colloids, Inc., Springfield, N.J.

[22] Filed: Jan. 9, 1970

[21] Appl. No.: 1,870

[52] U.S. Cl. ...... 106/300, 106/308 Q, 106/308 N, 106/308 C
[51] Int. Cl. ...... C09c 1/36
[58] Field of Search ...... 106/300, 308 Q, 308 C, 308 N

[56] References Cited

UNITED STATES PATENTS

| | | | |
|---|---|---|---|
| 2,819,176 | 1/1958 | Vartanian | 106/308 N |
| 3,390,961 | 7/1968 | Roberts et al. | 106/300 |
| 3,536,510 | 10/1970 | Allen et al. | 106/300 |

Primary Examiner—James E. Poer
Attorney—Kenyon & Kenyon, Reilly Carr & Chapin

[57] ABSTRACT

For facilitating handling and shipment titanium dioxide pigment is prepared in the form of an aqueous suspension wherein the concentration of the titanium dioxide is from about 40 percent to about 80 percent by weight of the suspension and as an agent which retards settling and packing there is included in the suspension about 0.04 percent to about 0.4 percent by weight of the suspension a water-soluble additive selected from the group of substances consisting of citric acid, tartaric acid, the sodium, potassium and ammonium salts and acid salts of citric and tartaric acids, and mixtures of said substances with each other. Preferably, as an agent which further retards settling, there is included in the suspension a gum that is in an amount not greater than about 0.4 percent by weight of the suspension and that in the amount used does not induce substantial gelation of the suspension. It likewise is preferable to include in the suspension from about 0.01 percent to about 0.1 percent by weight of the suspension of a sequestering agent for calcium cations.

9 Claims, No Drawings

3,663,284

TITANIUM DIOXIDE SUSPENSIONS

THE FIELD OF THE INVENTION

This invention relates to titanium dioxide pigments and relates more specifically to the suspension and stabilization of concentrated aqueous dispersions of titanium dioxide pigments.

THE BACKGROUND OF THE INVENTION

Titanium dioxide is usually manufactured from ilmenite and rutile ores either by the sulfate process or the titanium tetrachloride process. Two crystal forms of titanium dioxide are in general use, rutile and anatase. The crystal form is determined by the method of manufacture. Rutile has a slightly higher refractive index than anatase and more hiding power. Anatase has better chalking properties. Both types are used in oil and water base paints, paper coatings, paper filler, plastics, rubber, porcelain enamels, welding rod coatings, glass enamels, etc.

Titanium dioxide pigments are shipped either in dry form packed in bags or in the form of concentrated aqueous slurries in tank cars.

Shipment as a slurry has the advantage over dry shipments in that it avoids the expense of bagging, reduces handling by both manufacturer and user and saves valuable storage and shipping space because of the smaller volume occupied by concentrated slurries. For example, a 65 percent aqueous slurry of titanium dioxide has only half the volume as the same amount of dry pigment. It can easily be pumped and metered with simple equipment.

Aqueous slurries of pigment, however, have certain disadvantages. If the slurries are not kept stirred the pigment settles and packs in the bottom of the storage tanks within a few hours. The settled pigment packs so hard that it is almost impossible to redisperse. Another disadvantage of slurries is that they are not stable to freezing. If a slurry is frozen the pigment particles agglomerate and cannot be redispersed after thawing. Another disadvantage of concentrated aqueous slurries is that under certain conditions in the presence of small amounts of electrolytes, particularly salts of divalent metals, the slurries will thicken to the consistency of a paste which can neither be agitated nor pumped.

Purified grades of titanium dioxide disperse quite readily in water. In a dispersed system each solid particle is isolated from other particles by a layer of liquid. If the particles are very small and the liquid relatively viscous the particles may remain suspended for a considerable length of time. Though small, titanium dioxide particles are quite dense and in a medium such as water they tend to settle rapidly and form a hard packed sediment within less than a day's time. The sediment is hard because the particles, being independent of each other, can keep moving until they occupy the smallest possible volume. Such a sediment is almost impossible to redisperse.

A dispersion of titanium dioxide flocculates in the presence of most electrolytes. In a flocculated system the particles interact with each other to form aggregates. The interaction may be weak or strong depending on the concentration of pigment and the type and quantity of electrolyte present. Trivalent ions such as ferrous and aluminum ions are stronger flocculating agents than divalent calcium and barium ions which in turn cause more aggregation than monovalent ions such as sodium and potassium ions. In flocculated systems the sediment is more voluminous and does not pack as hard as in dispersed systems. The reason for this is that once the particles have become part of an aggregate they are immobilized and cannot fill all the voids in the sediment. If the flocculated system contains a low percentage of solids the aggregates are soft and the sediment can frequently be redispersed with relative ease by applying a shearing force such as stirring. If, on the other hand, the percentage of solids is high, flocculation causes the whole system to thicken into an unmanageable paste that cannot be made fluid again. Even very small amounts of electrolyte can cause this type of thickening when the percentage of solids is high. In the manufacture of titanium dioxide for use in concentrated slurries special precautions are taken to free the pigment of electrolytes such as soluble calcium salts. Nevertheless thickening frequently occurs in spite of these precautions. Small amounts of residual calcium salts in the pigment may gradually dissolve and thicken a dispersion that was originally fluid. Calcium ions present in the water used for the dispersion create a similar problem. Sequestrants for calcium ions, such as sodium hexametaphosphate, are frequently used to aid dispersion, but the effect is only temporary and thickening may occur after a few days.

In an ideal titanium dioxide dispersion the particles should remain in suspension indefinitely. In practice this is not necessary, but it is desirable to retard sedimentation or at least to produce a soft sediment that can easily be redispersed. The ideal dispersion should also remain fluid and not become pasty.

One method of retarding settling is to increase the viscosity of the dispersing fluid. In aqueous systems much use has been made of gums and clays for this purpose. Water-soluble gums such as guar, locust bean, tara, karaya, tragacanth, alginates, carrageenates, starches, modified starches, dextrins, carboxymethylcellulose, ethylcellulose, microbial polysaccharides, gum arabic and synthetic gums have been used in a variety of paints, printing pastes and pigment dispersions with varying degrees of success.

When the pigment dispersions (e.g. paints) contain a relatively low percentage of solids these gums are quite adequate for preventing or retarding settling. However, when the pigment concentration is increased, namely, so as to be of the order of 40 percent or higher, the gums are no longer as effective. Excessive thickening of the fluid medium results in dispersion with poor flow properties. Furthermore, some of the gums are polyelectrolytes which cause flocculation and give thick pastes. Others contain salt impurities which have the same effect. The gums give no adequate protection against freezing. More generally, when the concentration of titanium dioxide pigment is of the order of 40 percent by weight or more of the suspension the interaction between the particles is much more critical and expedients heretofore proposed concerned with particle suspension, flocculation and freeze thaw stability are not effectively applicable.

Usually a concentrated dispersion of titanium dioxide in water will contain from 40 to 80 percent by weight of solids. From the standpoint of economy the higher the concentration the better. There is, however, a practical limit to the concentration of solids beyond which the dispersion ceases to be fluid. At least 10 percent water is required to fill the voids between particles and approximately 10 percent more is needed to separate the particles enough so that they can flow past each other. For practical purposes a solids content of 60 to 70 percent is most desirable.

OBJECTS OF THE INVENTION

A principal object of this invention is to prevent or reduce settling and packing of concentrated suspensions of titanium dioxide pigments. Another object is to stabilize such suspensions against agglomeration due to freezing. A further object is that of minimizing the thickening of such suspension caused by certain electrolytes.

GENERAL STATEMENT OF INVENTION

This invention is predicated on the discovery that settling and packing of concentrated aqueous suspensions of titanium dioxide pigments can be substantially retarded by the presence therein at a concentration of about 0.04 percent to about 0.4 percent by weight of the suspension of a water-soluble additive selected from the group of substances consisting of citric acid, tartaric acid, and the sodium, potassium and ammonium salts and acid salts of citric and of tartaric acids. Such salts and acid salts include salts containing one or more of the cations sodium, potassium and ammonium and said additive may contain mixtures of any of the substances in said group.

For brevity, the foregoing will be referred to collectively as citrates and tartrates. The preferred citrates and tartrates are tripotassium citrate and dipotassium tartrate. The preferred concentration of said additive is between 0.08 percent and 0.15 percent.

It also has been discovered that said presence of said citrates and tartrates makes it possible to redisperse concentrated aqueous suspensions of the character aforesaid after freezing and thawing.

Though the aforesaid citrates and tartrates retard settling they do not always prevent it completely in that soft sediments which are easy to disperse are formed. In order to further retard settling or eliminate it completely in those instances when some settling of the character aforesaid occurs the useful effects of the citrates and tartrates may be employed in combination with a small amount, namely, in an amount not greater than about 0.4 percent by weight of the suspension, of a water-soluble gum which substantially decreases settling and which in the amount used does not produce substantial gelation of the suspension. The preferred water-soluble gums are carrageenan, carboxymethylcellulose, carboxyethylcellulose, methylcellulose, ethylcellulose, water-soluble alginate salts, propyleneglycol alginate, and microbial polysaccharides, namely, polysaccharides produced by microorganisms. The following are examples of microbial polysaccharides (prepared by the U.S. Department of Agriculture, Northern Regional Research Laboratory, Peoria, Illinois):

Polysaccharide B-1459, USDA, ARS Bulletin CA-N-9, Sept. 1959. (Produced by the bacterium *Xanthomonas campestris.*)

Polysaccharide Y-1401, USDA, ARS Bulletin CA-N-14, April 1961 (Produced by the yeast *Cryptococcus laurentii.*)

Polysaccharide B-1973, USDA, ARS Bulletin CA-N-21, May 1962. (Produced by a bacterium of the Arthrobacter species.)

Polysaccharide Y-2448. (Produced by the yeast *Hansenula holstii.*) Polysaccharide B-1459 is sold commercially by the Kelco Company under the trade name Kelzan and is identified as Kelzan in some of the examples hereinafter described. Other examples of water-soluble gums which may be used are sulfated starch, sulfated cellulose, sulfated tara, sulfated locust beam gum, sulfated guar, gum tragacanth and furcellaran. The gum is essentially non-reactive with the titanium dioxide pigment and merely by its effect on the viscosity of the water phase complements the specific effect of the citrate and tartrate in further reducing settling to such extent that in some instances no settling at all occurred after as long as 9 weeks. Moreover, the dispersion does not thicken and can be readily redispersed after freezing and thawing.

When using carrageenan as the gum it is advantageous to use potassium rather than sodium citrate or tartrate because potassium induces gelatin and while it is undesirable to produce a gel structure which adversely affects the flow properties of the suspension, the concentration of the carrageenan is so low that the effect of the potassium cation is slight and does not interfere with the flow properties of the suspension while improving the capacity of the carrageenan to aid in the suspension of the titanium dioxide particles.

With certain lots of titanium dioxide the addition of a citrate or tartrate causes thickening of the dispersion when first made up. However, within a few hours the suspension becomes fluid and remains that way thereafter. It has been found according to a further feature of this invention that the initial thickening may be eliminated or minimized by the inclusion in the water of the suspension before the titanium dioxide is added from about 0.01 to about 0.1 percent by weight of the suspension of a calcium sequestrant. While the cause of the initial thickening followed by restoration of fluidity is not understood, the effectiveness of a calcium sequestrant in preventing the initial thickening is believed to be due to the presence of traces of calcium in certain lots of titanium dioxide pigment or in certain gums, or both, which initially induce thickening but which on standing become bound to the citrate or tartrate with resultant restoration of fluid consistency. Calcium sequestrants, as such, are well known. Examples of preferable calcium sequestrants for use according to this further feature of the invention are tripolyphosphate, sodium hexametaphosphate, and sodium and potassium salts of ethylenediamine tetraacetic acid. Preferably the amount of sequestrant does not exceed 0.06 percent by weight of the suspension.

The method of addition is not important. The titanium dioxide may be added to the aqueous solution of the citrate or tartrate along with any gum and sequestrant that is employed or the titanium dioxide may be dispersed in the water first and the other ingredients added afterwards. Another alternative is to split the water between the titanium dioxide and the other ingredients and then mix the two dispersions together. When a gum is used which is slow to dissolve it usually is desirable to heat the gum solution and cool it before commingling the titanium dioxide pigment therewith.

The mechanism by with the citrates and tartrates stabilize titanium dioxide suspensions is not altogether understood. Since they both are fairly strong electrolytes one would expect that they would cause flocculation and it is surprising and unusual that they have the opposite effect. If the mechanism involved the removal of contaminating ions such as calcium, the stronger sequestrants would be expected to have a similar effect, but they do not.

DETAILED DESCRIPTION OF INVENTION

The nature and practice of this invention are further described by the following illustrative examples:

EXAMPLE 1

One thousand-gram samples containing 66 percent titanium dioxide and 34 percent water were prepared with various amounts of tripotassium citrate ($K_3$ citrate), tripotassium salt of ethylenediamine tetraacetic acid (EDTA), and carrageenan.

The carrageenan and salts were dispersed in the water, heated to 70° C., cooled to room temperature and the titanium dioxide was slowly added to this mixture. The results are shown in Table I. Figures represent additive content in percent by weight of total mixture.

TABLE I

| Exp. number | Carrag., percent | $K_3$, citrate, percent | EDTA, percent | Appearance after — | | |
|---|---|---|---|---|---|---|
| | | | | Immediate | 1 day | 30 days |
| 1 | 0 | 0 | 0 | Thin fluid | Hard packed sediment | Very hard sediment. |
| 2 | .072 | .144 | 0 | Very viscous | Slightly viscous fluid | Very light soft sediment. |
| 3 | .084 | .168 | .054 | Slightly viscous fluid | do | Slightly viscous. No sediment. |
| 4 | 0.150 | .300 | 0.100 | Viscous fluid | Viscous fluid | No sediment, viscous but pours easily. |
| 5 | 0.084 | 0 | 0 | Pasty thick | Pasty thick | Pasty thick won't pour. |

EXAMPLE 2

Five hundred and sixty-five gram samples containing 70 percent titanium dioxide and 30 percent water were prepared with various amounts of carboxymethylcellulose (CMC) or with a bacterial polysaccharide (Kelzan) and various amounts of tripotassium citrate ($K_3$ citrate) or trisodium citrate ($Na_3$ citrate).

The salts and gums were dispersed in cold water and the titanium dioxide was then added slowly. Results are shown in Table II.

TABLE II

| Experiment No. | Salt added | Gum added | 1 Day |
|---|---|---|---|
| 1 | 0 | 0 | Hard sediment |
| 2 | 0.176% K₃ citrate | 0 | Fluid no sediment |
| 3 | 0 | 0.074% CMC | No sediment |
| 4 | 0.062% Na₃ citrate | 0.074% CMC | No sediment |
| 5 | 0.28% Na₃ citrate | 0.074% CMC | No sediment |
| 6 | 0.149% K₃ citrate | 0.074% CMC | No sediment |
| 7 | 0 | 0.112% Kelzan | No sediment |
| 8 | 0.074% K₃ citrate | 0.074% Kelzan | No sediment |
| 9 | 0.112% K₃ citrate | 0.112% Kelzan | No sediment |

| Experiment No. | Appearance after 3 weeks | 7 weeks | 9 weeks |
|---|---|---|---|
| 1 | Very hard sediment not dispersible | — | — |
| 2 | Soft dispersible sediment | No change | No change |
| 3 | Moderate sticky sediment | Heavy gummy sediment | — |
| 4 | Slight dispersible sediment | Slight dispersible sediment | — |
| 5 | No sediment | Slight dispersible sediment | No change |
| 6 | Very slight dispersible sediment | No change | No change |
| 7 | Thickened paste | Thickened paste | — |
| 8 | Slight dispersible sediment | No change | No change |
| 9 | Traces of soft dispersible sediment | No change | No change |

EXAMPLE 3

Dispersions of 70 percent titanium dioxide in water were made by the same method as in Example 2. The dispersions were placed in a freezer at 0° F. overnight and then thawed out until they reached room temperature. In all frozen samples the titanium appeared agglomerated. Only those containing citrate could be redispersed with ease. The results are shown in Table III.

TABLE III

| Exp. No. | Salt additive | Gum additive | Dispersibility |
|---|---|---|---|
| 1 | 0 | 0.074% | Pasty very difficult redispersion |
| 2 | 0.088% K₃ citrate | 0 | Redispersed well |
| 3 | 0.168% K₃ citrate | 0 | Redispersed well |
| 4 | 0.112% K₃ citrate | 0.074% CMC | Redispersed well |
| 5 | 0 | 0.074% Carrageenan | Impossible to redisperse |
| 6 | 0.112% | 0.056% Carrageenan | Redispersed very well |

EXAMPLE 4

Titanium dioxide was dispersed in water containing various amounts of tripotassium citrate. The concentration of titanium dioxide in the solutions was 70 percent. When these mixtures containing citrate were first prepared they were fairly thick but they thinned down after a few hours. The results are shown in Table IV.

TABLE IV

| Sample | K₃ citrate, percent | Immediate viscosity, cps. | After one day viscosity, cps. | After one week |
|---|---|---|---|---|
| 1 | 0 | — | Heavy sediment packed hard. | Heavy sediment. Hard packed not redispersible. |
| 2 | 0.056 | 1,300 | 700 | Heavy sediment. Fairly easily redispersible. |
| 3 | 0.084 | 3,200 | 1,400 | Considerable sediment easily redispersed. |
| 4 | 0.112 | 11,400 | 2,000 | Some sediment, easily redispersed. |
| 5 | 0.140 | 15,000 | 2,700 | Soft sediment redispersible. |
| 6 | 0.168 | Soft paste | 3,400 | No sediment. Thick fluidized by stirring. |
| 7 | 0.210 | Paste | 4,200 | No sediment. Partly gelled, fluidized by stirring. |

EXAMPLE 5

Titanium dioxide suspensions containing 70 percent solids were made with various salts of citric and tartaric acid, with the results shown in Table V.

TABLE V

| | After one Week |
|---|---|
| 0.148% Dipotassium tartrate | Soft redispersible sediment |
| 0.035% Potassium acid tartrate | Fairly heavy redispersible sediment |
| 0.106% Mono potassium citrate | Soft redispersible sediment |
| 0.106% Monosodium dipotassium citrate | Soft redispersible sediment |
| 0.106% Citric acid | Soft redispersible sediment |

I claim:

1. An aqueous suspension of titanium dioxide pigment wherein the concentration of titanium dioxide pigment is between 40 percent and 80 percent by weight of the suspension and which contains as an agent which retards settling and packing from about 0.04 percent to about 0.4 percent by weight of the suspension of a water-soluble additive selected from the group of substances consisting of citric acid, tartaric acid, sodium potassium and ammonium salts and acid salts of citric and tartaric acids and mixtures of said substances with each other.

2. An aqueous suspension of titanium dioxide pigment according to claim 1 which contains as an agent which decreases settling a water-soluble gum that is in an amount not greater than about 0.4 percent by weight of the suspension and that in the amount used does not induce substantial gelation of the suspension.

3. An aqueous suspension according to claim 2 wherein said water-soluble gum is a gum selected from the group consisting of carrageenan, carboxymethylcellulose, carboxyethylcellulose, methylcellulose, ethylcellulose, water-soluble alginates, propyleneglycol alginate, sulfated starch, sulfated cellulose, sulfated tara, sulfated locust bean gum, sulfated guar, gum tragacanth, gum karaya, furcellaran and microbial polysaccharides.

4. An aqueous suspension according to claim 3 wherein said gum constitutes from about 0.05 percent to about 0.07 percent of the suspension.

5. An aqueous suspension according to claim 1 which contains from about 0.01 percent to about 0.1 percent of the weight of the suspension of a sequestering agent for calcium cations.

6. An aqueous suspension according to claim 5 wherein said sequestering agent is selected from the group consisting of potassium tripolyphosphate, sodium hexametaphosphate, and sodium and potassium salts of ethylenediamine tetraacetic acid.

7. An aqueous suspension according to claim 5 wherein the amount of said sequestering agent is from about 0.01 percent to about 0.06 percent by weight of the suspension.

8. An aqueous suspension according to claim 1 which contains
   as an agent which decreases settling a gum that is in an amount not greater than about 0.4 percent by weight of the suspension and that in the amount used does not induce substantial gelation of the suspension, and
   about 0.01 percent to about 0.1 percent by weight of the suspension of a sequestering agent for calcium cations.

9. An aqueous suspension according to claim 8 wherein said gum is selected from the group consisting of carrageenan, carboxymethylcellulose, carboxyethylcellulose, methylcellulose, ethylcellulose, water-soluble alginates, propyleneglycol alginate, sulfated starch, sulfated cellulose, sulfated tara, sulfated locust bean gum, sulfated guar, gum tragacanth, gum karaya, furcellaran and microbial polysaccharides.

* * * * *

UNITED STATES PATENT OFFICE
CERTIFICATE OF CORRECTION

Patent No. 3,663,284          Dated May 16, 1972

Inventor(s) _____

It is certified that error appears in the above-identified patent and that said Letters Patent are hereby corrected as shown below:

Col. 3, line 52, delete "gelatin" and substitute --gelation--.

Col. 5, TABLE III, line 74, insert under "0.112%" --$K_3$citrate--.

Col. 6, claim 1, line 62, insert a comma (,) after "sodium".

Signed and sealed this 29th day of May 1973.

(SEAL)
Attest:

EDWARD M. FLETCHER, JR.　　　　　　ROBERT GOTTSCHALK
Attesting Officer　　　　　　　　　　Commissioner of Patents